C. L. SCHWARZ.
TIRE.
APPLICATION FILED DEC. 28, 1907.
927,006.
Patented July 6, 1909.
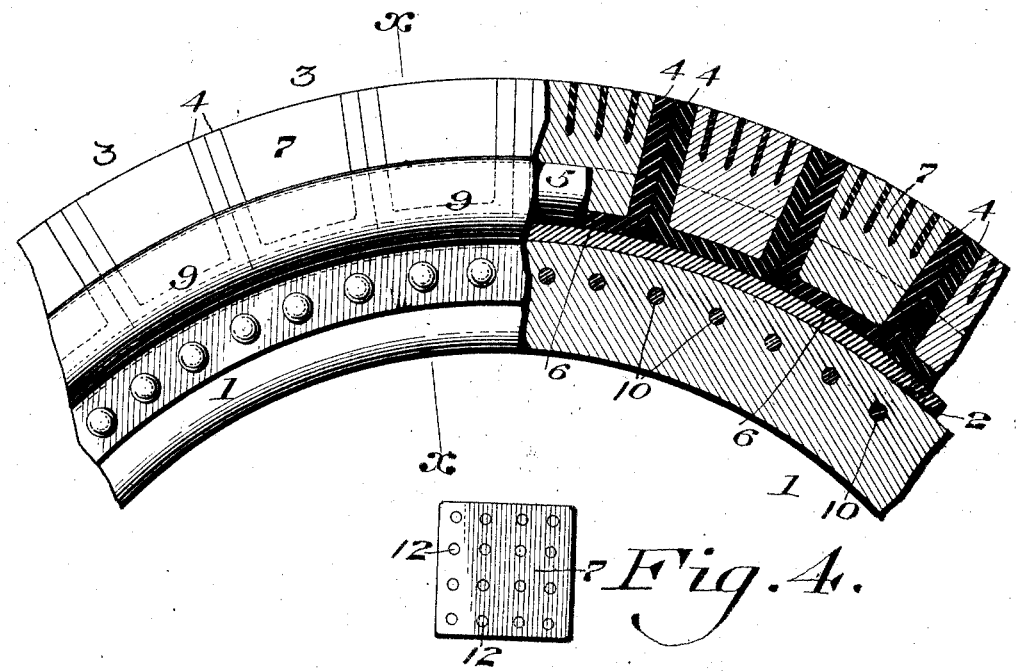
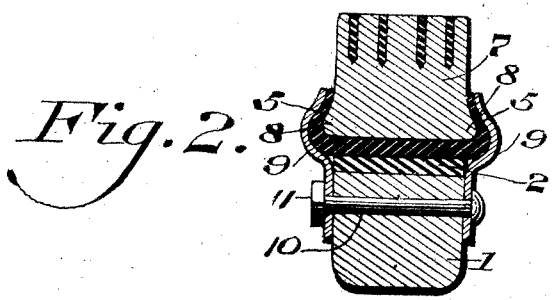
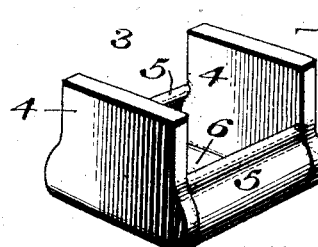

UNITED STATES PATENT OFFICE.

CHARLES L. SCHWARZ, OF PHILADELPHIA, PENNSYLVANIA.

TIRE.

No. 927,006.   Specification of Letters Patent.   Patented July 6, 1909.

Application filed December 23, 1907. Serial No. 408,362.

*To all whom it may concern:*

Be it known that I, CHARLES L. SCHWARZ, a citizen of the United States, residing in the city and county of Philadelphia, State of Pennsylvania, have invented a new and useful Tire, of which the following is a specification.

My invention relates to a new and useful tire for vehicle wheels and consists of a plurality of solid bearing faces with interfitting resilient material between said solid faces and a resilient support for said faces.

It further consists of a resilient socket for seating or receiving the solid member of the tire.

It further consists of other novel features of construction, all as will be hereinafter fully set forth.

Figure 1 represents a partial side elevation and partial sectional view of a portion of a wheel showing my tire in position. Fig. 2 represents a sectional view on line x—x, Fig. 1. Fig. 3 represents a perspective view of one of the sockets in detached position. Fig. 4 represents a plan view of one of the solid bearing members or faces.

Similar numerals of reference indicate corresponding parts in the figures.

Referring to the drawings, 1 designates the felly or rim of a wheel which can be made of any desired material and upon the outer surface of which is supported a plate 2 which is preferably of metal and which serves to strengthen the said felly or rim of the wheel. Seated upon the said plate are the resilient socket members 3 which are formed with the end pieces 4 and the side members 5 which preferably do not extend to the same height as the end members 4 and the lower walls 6 of said sockets being seated upon the metal plate 2.

7 designates solid blocks or faces such as wood or other suitable material, which are adapted to be seated in the sockets 3, said blocks being preferably formed with the flaring edges 8 on opposite sides, as best understood from Fig. 2, it being seen that as the end walls 4 of the sockets are between the adjacent blocks 7 that the tire will consist of alternating solid faces and resilient material, and that as the blocks or faces are seated upon the bottom walls 6 of the sockets that a resilient bearing or support is formed for the said solid blocks 7.

9 designates clips which are secured to the felly 1 in any desired manner, as by bolts 10 and nuts 11, said clips engaging the sides of the sockets 3 and being of suitable shape to seat the extensions 8 of the blocks 7, so that the said blocks cannot pass between the outer edges of the clips 9 and thus will be secured and firmly held in position as well as the sockets 3.

In the face of the blocks 7, I may provide the metal studs 12 to assist in making a bearing surface for the solid portion of greater wearing quality.

It will be seen from the above that the tire is thus composed alternately of solid and resilient materials so that puncture of the same cannot occur, the resilient sides are protected as far as possible, and a tire is formed which will not skid by reason of the wood, rubber and metal pins or studs.

The projecting portions 8 of the blocks and the clips 9 form practically a dovetail to prevent outward displacement of the blocks and sockets and I preferably form the outer sides of the socket of such an extent, that they do not extend beyond the outer edge of the clip 9, so that the said sides cannot be ground off by obstructions on the roadway.

Having thus described my invention, what I claim as new and desire to secure by Letters Patent, is:—

1. In a device of the character described, sockets formed of resilient material, solid blocks having flaring edges adapted to be seated in said sockets, and clips connected with the wheel and seating said edges for locking the parts in position.

2. In a device of the character described, resilient sockets formed of end pieces, sides and a bottom, blocks of solid material seated in said sockets, the end pieces of said sockets abutting between said blocks, and means for holding said sockets and blocks in proper position.

3. In a device of the character described, resilient sockets formed of end pieces, sides and a bottom, blocks of solid material seated in said sockets, the end of said sockets abutting between said solid material, and clips connected with the wheel and engaging the sockets for holding the blocks and sockets in position.

4. In a device of the character described, resilient sockets formed of sides, end pieces and bottom, blocks seated in said sockets, the adjacent ends of the sockets abutting between said blocks, extensions on the sides of said blocks, and clips secured to the wheel and forming with the extensions, a dovetail joint to prevent the displacement of the sockets and blocks.

5. A vehicle tire formed of a plurality of sections of solid material, a resilient support for said sections, resilient material integral with said resilient support and situated between the adjacent solid sections, and a plurality of metal studs seated in said solid sections.

6. In a device of the character described, resilient sockets having end pieces and a bottom, blocks of solid material seated in said sockets, the end pieces of said sockets abutting between said blocks, and means for holding said sockets and blocks in proper position and a plurality of pins seated in said solid material.

7. In a device of the character described, resilient sockets having end pieces and a bottom, blocks of solid material seated in said sockets, the end pieces of said sockets abutting between said blocks and means for holding said sockets and blocks in proper position.

CHARLES L. SCHWARZ.

Witnesses:
C. D. McVay,
E. B. Morris.